W. McLucas,
Corn Planter.

No. 92,861. Patented July 20. 1869.

WITNESSES.
Edwin James
John S. Hollingshead Jr.

INVENTOR.
William McLucas
per I. E. J. Holmead
Attorney

United States Patent Office.

WILLIAM McLUCAS, OF REINERSVILLE, OHIO.

Letters Patent No. 92,861, dated July 20, 1869.

---

IMPROVEMENT IN CORN-PLANTERS.

---

The Schedule referred to in these Letters Patent and making part of the same.

---

*To all whom it may concern:*

Be it known that I, WILLIAM McLUCAS, of Reinersville, in the county of Morgan, and State of Ohio, have invented certain new and useful Improvements in Double Corn-Planters; and I do hereby declare that the following is a full, clear, and exact description of the same, reference being had to the accompanying drawing, and to the letters of reference marked thereon, making part of this specification, in which—

Figure 1:
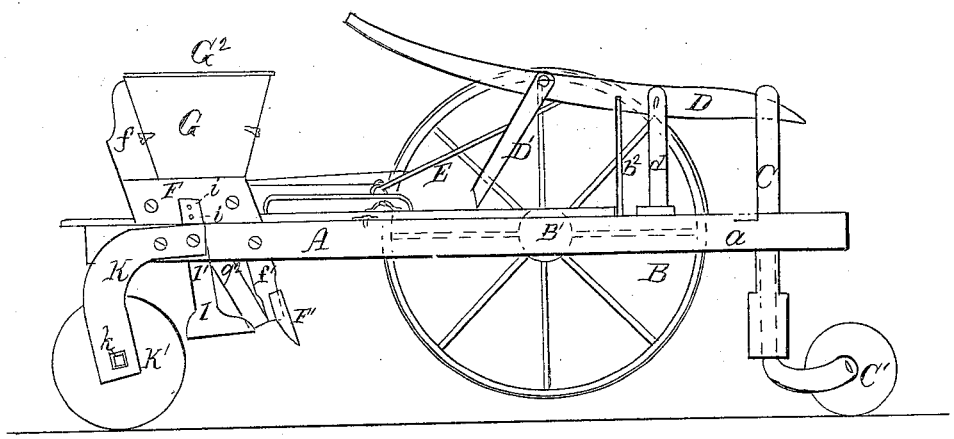
Figure 1 is a side-view of the machine, with one of the driving-wheels removed, and the other elevated, in consequence of the caster-wheel being lowered.
Figure 2:
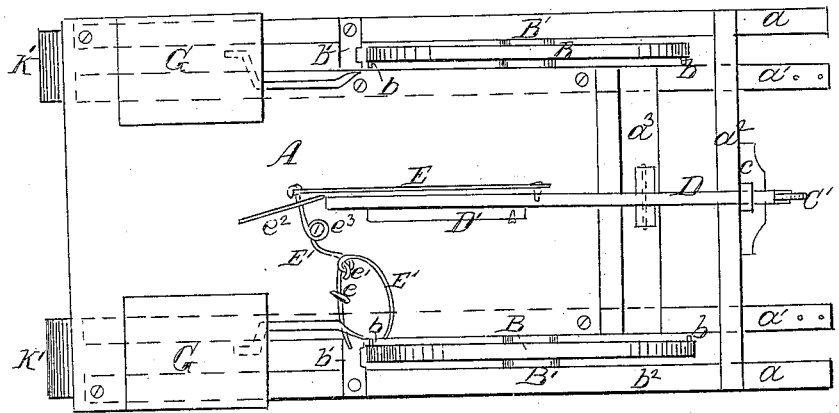
Figure 2 is a top plan view.
Figure 3:
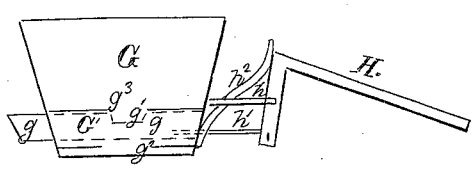
Figure 3 is a horizontal view of the hopper and the operating-mechanism by which the discharge of the grain is regulated.

My present improvement, in some of the features of its general outline, resembles the seed and cornplanters patented to me, respectively, on February 4 and July 14, 1868.

The object of my present invention is a simple and practical method, whereby the driving-wheel, which operates the dropping-mechanism of the hopper, is rendered inoperative.

On a suitable standard, near the front of the machine, there is fulcrated a lever.

To the outer end of this lever there is secured an upright arm, to which is attached a caster-wheel.

I also secure to this lever, and in the rear of the point at which it is fulcrated, a rod, which communicates with another rod, working on the platform.

This latter rod is connected with clamping-jaws, so arranged that its movement opens and closes the same, *i. e.*, when the handle of the lever is elevated, the jaws are drawn together, and when lowered, they are forced open.

The advantages of this arrangement will readily suggest themselves.

The elevating of the handle of the lever not only causes the clamping-jaws to catch and firmly hold in position the driving-wheel, but also the same movement of the lever forces down the upright arm, to which the caster-wheel is secured. Thus, by a simultaneous movement of the lever, the driving-wheel is elevated from the ground and firmly locked.

My invention also consists in securing on the frame a guide-post, which will always indicate to the driver the condition of the operating - mechanism. This post is arranged at such a position, that when one of the projecting pins or stumps on the driving-wheel is opposite said post, the next of the series is in exact position to raise the lever that causes the instant dropping of the grain.

My invention also consists in so securing to the hopper a spring, that its tension is always employed to force in position the lever that operates the slotted roller, which conveys the grain to the drop-tube, in combination with the method employed of rendering the shovel that covers the grain adjustable, so that the amount of dirt deposited in the drill can be readily regulated.

My invention also consists in the manner in which the axle, on which work the rear roller-wheels, is hung.

To enable others skilled in the art to make and use my invention, I will now proceed to describe its construction and operation.

A is the platform, and rests on four side timbers, $a$ $a^1$ and $a\ a^1$, two on each side, and all running parallel to each other.

These timbers are united at their rear end by the platform, and at their front end by the cross-timber $a^2$.

The side timbers $a^1\ a^1$ are also united by an additional cross-piece, $a^3$.

All that portion of the platform that is in front of the hoppers only, projects over the inner side timbers $a^1\ a^1$, leaving an opening between $a$ and $a^1$, on each side of the machine, sufficiently wide to allow of the free revolution of the driving-wheels, &c.

All the portions of the machine now described are usually made entirely of wood, and firmly secured together by mortise and tenon, screws, bolts, or in any other convenient manner.

B B are the driving-wheels, and are provided with projecting pins or stumps $b\ b$.

These wheels are of the same style, and are constructed on the same principle as are the wheels described in my patents before referred to. They may be made of wood or metal, and are firmly secured to an axle, $B^1$, which works in suitable bearings in the side timbers $a\ a\ a^1\ a^1$.

On the outer face of the cross-timber $a^2$, I secure a slotted bearing and guide-plate, $c$.

Through its opening works the upright arm C, to the lower end of which is firmly secured the caster-wheel C'.

In a mortise-opening or socket, in the upper section of the upright arm C, is firmly secured one end of the lever D.

This lever D is fulcrated in suitable bearings on the post $d$, and has pivoted to it a check-arm or short lever, D', by means of which it can be rendered firm, and have a secure support at any desired angle.

To this lever D there is also secured a rod, E, which, by means of an eye or loop, is connected with a rod, E', which latter rod passing through a guide-staple, $e^2$, secured on the platform A, passes or is wound around a fulcrum-bolt or pin, $e^3$, also secured to the platform.

By means of an eye, $e^1$, there is attached to the rod E', a short rod, $e$.

These two rods, E' $e$, are curved, and clasp the driving-wheel B when the caster is lowered, on the well-known principle of clamping-jaws, firmly holding said wheel until the handle of the lever D is lowered, when, through the action of the rod, and simultaneous with the elevation of the caster C', the jaws are opened, and carried to such a position as not to interfere with the freest movement of the wheel B.

Immediately in the rear of the driving-wheels B B are secured, to the side timbers, scraper-plates $b^1 b^1$.

These plates are so arranged as to keep the tires of the wheels always free from dirt and other obstructions.

There is also secured to one of the side timbers $a$, a guide-post or arm $b^2$.

This post or arm is arranged at such a relative position with the projecting pins or stumps $b\ b$ of the wheel B, that when one of the same is opposite the post, the next of the series is exactly in position to elevate the lever, whose action controls the discharge-mechanism of the hopper.

This post is most useful in this regard: The driver has simply to see the position of the flange, in respect to the same, to instantly discover the condition of the hopper, and to ascertain whether, for the purpose of turning from furrow to furrow, his machine is in condition to fill the first hill of the new as has filled the last of the old.

In an open frame-work, F, rests the hopper G.

This frame-work rests on the side timbers $a\ a\ a^1\ a^1$.

The ends of the frame-work F are much longer than the sides, and extend in opposite directions, the rear one, $f$, extending up above the sides, and forming the rear bearing or support for the hopper G, and the forward end, $f'$, descending and passing down through the opening between $a$ and $a^1$, furnishing the bearing to which the drill-shovel-plow F' is secured.

The hopper G is constructed on the same general principle as is the hopper in my patent of July 14, 1868, i. e., in its bottom there is a tube, $G^1$, having an opening, $g^1$, in its centre, through which passes the grain to the slotted or corrugated arm $g$, which is, through the action of the projecting pins or stumps $b\ b$, on the lever H, moved to and fro in the tube $G^1$, conveying, at its forward movement from the opening $g^1$ to the drop-tube $g^2$, the amount of grain required for each hill.

$g^3$ is a check-pin, secured to the arm, and working through the opening $g^1$, and which prevents the former from ever being conveyed beyond the desired position in either direction.

The hopper G may be provided with a cover or lid, $G^2$.

H is a bell-crank lever, and is fulcrated on a staple, $h$, or other suitable bearing, arranged on the front of the hopper.

Its short arm is connected by a rod, $h^1$, with the arm $g$, while its long arm projects out alongside of the driving-wheel B, occupying such relative position thereto that it is continually operated upon by the projecting pins or stumps $b\ b$.

$h^2$ is a spring, secured to the front of the hopper G, its free end resting against the lever H, and bearing upon the same in such manner, that the moment the lever is free from one of the projecting pins or stumps $b$, which has carried the opening in the arm $g$ from the opening in the supply-tube $g^1$, where it was filled, to the drop-tube $g^2$, where it was emptied, the spring will instantly force the lever down, and thus convey the arm $g$ to such position, in relation to the tube, that its opening or corrugation will be again filled.

I is a covering-shovel or plow, and is supported in an adjustable upright, I', which is provided with a series of holes or openings, $i\ i$, by means of which the shovel is elevated or lowered, and can be readily made to cover to a greater or less depth, as occasion may require.

This upright I' has its bearing in the forward end of the curved metallic elbows K, K, secured to the rear end of the timbers $a\ a$.

In the lower ends of these curved elbows K K are square sockets or openings $k\ k$, in which enters the square head of the axle, on which the roller-wheels K' K' are secured, and around which they revolve.

Having thus fully described my invention,

What I claim therein as new, and desire to secure by Letters Patent of the United States, is—

1. The lever D, rods E E' $e$, and fulcrum-bolt or pin $e^1$, when the same are so combined and arranged as to act as a clamping-brake for the wheel B, substantially as described, as and for the purpose specified.

2. The lever D, rods E E' $e$, upright C, and caster-wheel C', when the same are so combined and arranged that simply by raising the lever the wheel B, by a simultaneous movement, shall be elevated and clamped, substantially as described.

3. The wheel B and guide-post $b^2$, when the same are so combined and arranged as to operate substantially as described, as and for the purpose specified.

4. The curved elbows K K, when the same are so arranged as to furnish bearings for the adjustable arm I and the axle to which the roller-wheels K' K' are attached, substantially as described, as and for the purpose specified.

In testimony whereof, I have signed my name to this specification, in the presence of two subscribing witnesses.

WILLIAM McLUCAS.

Witnesses:
L. P. CULVER,
ROBERT ROWLAND.